United States Patent [19]
Snyder et al.

[11] Patent Number: 5,459,447
[45] Date of Patent: Oct. 17, 1995

[54] AFTERMARKET INSTALLABLE DUAL SENSITIVITY SHOCK DETECTOR

[75] Inventors: Douglas D. Snyder, Bergholz; Kevin Lipovsky, West Milton, both of Ohio

[73] Assignee: John Snyder, Inc., Wintersville, Ohio

[21] Appl. No.: 262,140

[22] Filed: Jun. 20, 1994

[51] Int. Cl.[6] .............................. B60R 25/10; G08B 13/00
[52] U.S. Cl. .............. 340/426; 340/566; 340/665; 340/692; 340/689; 340/568; 340/429; 200/61.45 R; 200/52 A; 73/1 DV; 73/DIG. 1
[58] Field of Search ..................... 340/426, 429, 340/566, 511, 660–663, 665, 692, 689, 568; 200/61.45 R, 61.52, 52 A; 73/570, 1 D, 1 DV, 649–652, 654

[56] References Cited

U.S. PATENT DOCUMENTS

| | | | |
|---|---|---|---|
| 4,584,569 | 4/1986 | Lopez et al. | 340/566 |
| 4,864,288 | 9/1989 | Cross | 340/566 |
| 5,185,593 | 2/1993 | DuRand, III et al. | 340/566 |

OTHER PUBLICATIONS

Bulldog Security, Inc., advertisement flyer for Bulldoy 2001 talkinr car alarm Sep. 22, 1994.

*Primary Examiner*—Donnie L. Crosland
*Attorney, Agent, or Firm*—Wood, Herron & Evans

[57] ABSTRACT

An aftermarket mechanical shock detector for mounting to protected property containing an existing alarm system. The shock detector incorporates a piezoelectric transducer detecting mechanical vibration and generating an electrical vibration signal, and circuitry for comparing the vibration signal to thresholds. The shock detector includes two separately adjustable thresholds. If the vibration signal exceeds either threshold, the shock detector creates an electrical connection between two terminals, thereby triggering a previously-installed alarm circuit to create an alarm.

12 Claims, 2 Drawing Sheets

AFTERMARKET INSTALLABLE DUAL SENSITIVITY SHOCK DETECTOR

FIELD OF THE INVENTION

The present invention relates to shock detectors of the type used in security systems for preventing theft of vehicles and similar property.

BACKGROUND OF THE INVENTION

Motor vehicles and other large and expensive machines are often supplied (or retrofitted) with security systems to prevent unauthorized use or theft. Most motor vehicle security systems make use of one or more electrical switches mounted in, for example, the vehicle's doors, hood, or trunk. Typically, these switches are electrically connected to a central alarm circuit by one or more wire conductors. When a door, the hood or the trunk is opened, the switch mounted therein creates a connection between a conductor and the body of the vehicle, which serves as an electrical ground. This ground connection is detected by the central alarm circuit which, if the alarm is armed, sounds an alarm, e.g., the vehicle's horn.

Some security systems also include a shock detector which detects mechanical shock imparted to the body of the vehicle. Ideally, a shock detector will sound the alarm when a thief or vandal mechanically shocks the vehicle by, for example, breaking a window. In this situation, a shock detector will sound the alarm even though the door, hood and trunk switches have not been activated, improving security.

One known drawback of shock detectors is that they are frequently over-sensitive; often a mere bump of the vehicle by a pedestrian or a neighboring car door can generate a false alarm. A second drawback is that shock detectors are typically included in only the most expensive security systems, and as a result are often unavailable to owners of mid-price range vehicles.

SUMMARY OF THE INVENTION

In accordance with principles of the present invention, there is provided a modular, aftermarket installable shock detector which is not only relatively inexpensive but also provides improved dual-level adjustable sensitivity to provide for a flexible alarm response based on the intensity of the detected shock.

Specifically, in one aspect the invention features a mechanical shock detector for mounting to protected property, incorporating a piezoelectric transducer detecting mechanical vibration and generating an electrical vibration signal, and circuitry for comparing the vibration signal to thresholds. If the vibration signal exceeds a threshold, the shock detector creates an electrical connection between two terminals, thereby triggering a previously-installed alarm circuit to create an alarm.

The property may be a vehicle such as an automobile, or may be any other property having an alarm circuit which may be enhanced by a shock detector.

In the disclosed embodiment, the shock detector is manufactured using compact, surface mount components, and is sufficiently inexpensive to be economically feasible for use with inexpensive property having less sophisticated alarm circuitry.

Furthermore, the disclosed shock detector compares the electrical vibration signal to two distinct, separately adjustable thresholds, and includes two terminals which can be separately connected to an alarm circuit for triggering separate alarms. This feature can be used to create multiple-level alarms, so that, for example, a bump to a fender from a pedestrian produces a different and less severe alarm signal than a hammer blow to the windshield. Because this feature modulates the alarm response in response to the detected shock, it reduces the tendency of shock detector alarms to generate excessive alarm responses. For this reason, a shock detector in accordance with the invention is not only useful in vehicles which do not already have a shock detector, but is also useful as a replacement for a less-sophisticated pre-installed shock detector.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
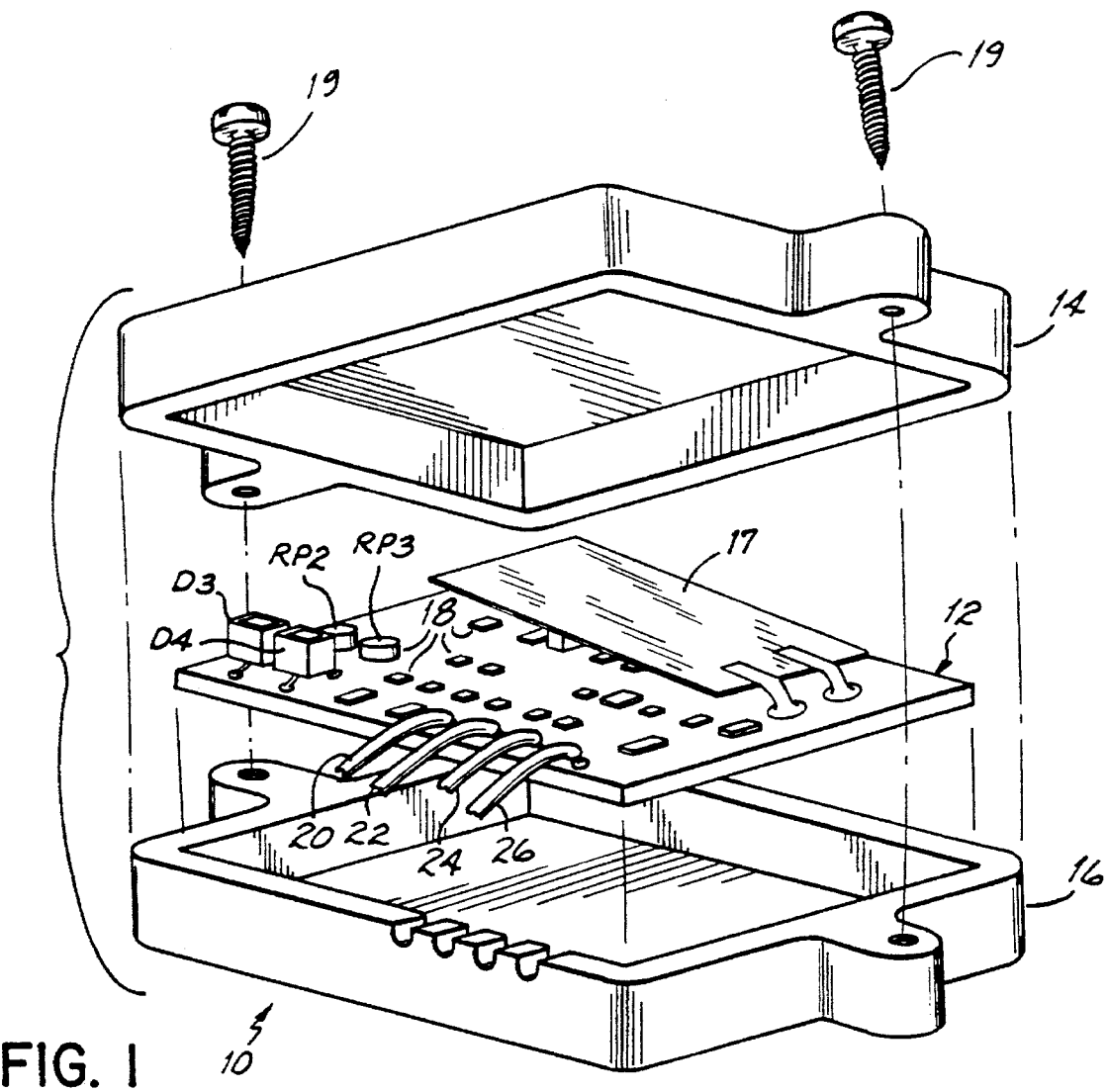
FIG. 1 is an enlarged disassembled view of a mechanical shock detector in accordance with principles of the present invention.

Referring to FIG. 1, an aftermarket mechanical shock detector 10 in accordance with the present invention includes a printed circuit board 12 encased within a clear plastic housing formed of two halves 14 and 16. Circuit board 12 is preferably manufactured using surface mount technology, thereby minimizing the size of shock detector 10.

Figure 2:
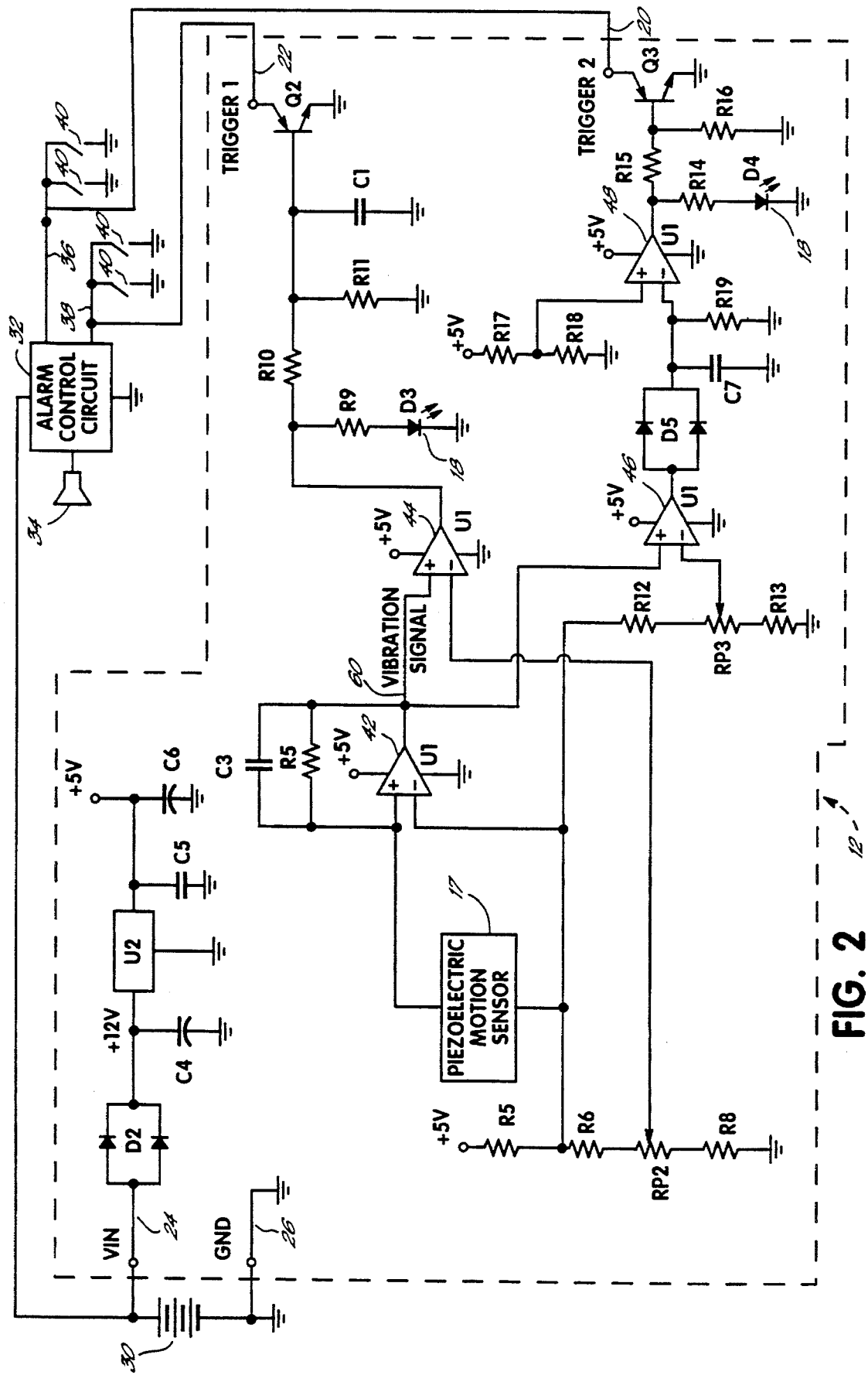
FIG. 2 is a circuit diagram of the circuitry included in the mechanical shock detector of FIG. 1, and connections to an exemplary alarm circuit.

Circuit board 12 includes a number of surface mounted components 18 such as resistors, capacitors, diodes, transistors, and an integrated circuit containing four operational amplifiers, as is more specifically detailed in FIG. 2. Also included is a strip 17 of piezoelectric material, two light emitting diodes (LEDs) D3 and D4, and two potentiometers RP2 and RP3.

Shock detector assembly 10 is mounted firmly to the body of the property to be protected by two sheet metal screws 19. Thus, assembly 10 is mechanically coupled to the property and will detect any vibrations. Where the protected property is an automobile, it has been found that the most effective shock detection is achieved by mounting the assembly 10 to the steering column.

When assembly 10 is solidly mounted to the protected property, piezoelectric strip 17 detects vibration of the property, and produces a corresponding electrical signal which is sensed by circuitry on circuit board 12. As described more specifically below, if this electrical signal exceeds either of two thresholds (each of which is preset by adjustment of a corresponding potentiometer RP2 and RP3), the circuitry on circuit board 12 triggers an alarm condition.

Four terminals 20, 22, 24 and 26 lead from circuit board 12 outside of housing 14, 16. These terminals are connected to a power supply and an existing alarm circuit in the protected property. As discussed in more detail below, when an alarm condition is triggered by circuit board 12, signals on these terminals relay the alarm condition to the existing alarm circuit. Furthermore, light emitting diodes D3 and D4 are illuminated while an alarm is activated, thus providing a visual signal of an alarm trigger, which can be used during installation when adjusting potentiometers RP2 and RP3 to select the appropriate threshold levels.

Referring to FIG. 2, the circuitry on circuit board 12 is configured for connection to a power supply such as is typically found on automobiles. Power for the circuit board is obtained from the vehicle's battery 30 via connections to terminal 24 and terminal 26, after conditioning by voltage regulator U2 and bypass capacitors C4, C5 and C6. In a typical vehicle, the negative or ground terminal of the battery is connected to the metal body of the vehicle. Thus, in this environment, terminal 26 may be connected to the body of the vehicle.

The circuit on circuit board 12 is also configured for interaction with the existing alarm system in the vehicle. A typical vehicle alarm system is illustrated in FIG. 2. A typical system includes an alarm control circuit 32 which monitors the status of various sensors in the vehicle, and produces an alarm signal under the appropriate conditions, typically by sounding a siren 34 or the vehicle's horn.

As shown diagrammatically in FIG. 2, a typical alarm control circuit 32 monitors sensors in the vehicle by detecting the voltage of one or more sensor conductors 36, 38. Typically, each sensor 40 in the vehicle essentially constitutes a switch which, when activated, forms an electrical connection between a sensor conductor 36 or 38 and the vehicle ground. This electrical connection is detected by the alarm control circuit, which, if the alarm is enabled, produces an alarm signal. Typical sensors include door sensors which detect when a door has been opened, an ignition sensor which detects whether the vehicle is running, and a motion sensor which detects motion of the vehicle.

Typically more than one sensor 40 is attached to each sensor conductor, forming a wired-OR of the sensors: if any one or more sensors on the sensor conductor is activated, the alarm will sound. Thus, for example, sensors at all of the doors may be connected to a single, common sensor conductor.

Sophisticated alarm circuits often have two or more sensor conductors, enabling the alarm circuit to distinguish and react differently to signals from different sensors. Thus, for example, one sensor conductor may be connected to door sensors, and another sensor conductor to an ignition sensor; using such a connection, the alarm circuit may behave differently when a door is opened than when the vehicle is started. E.g., a delay may be provided from the time that a door is opened before an alarm sounds, permitting the operator time to disable the alarm.

A circuit 12 in accordance with principles of the present invention is configured for connection to and interaction with a typical alarm system of the kind described above. In accordance with principles of the present invention, terminals 22 and 24 are connected to sensor conductors leading to the vehicle's alarm control circuit 32. Inside of circuit 12, transistors Q2 and Q3 are connected between terminals 22 and 24, respectively, and ground. When either of transistor Q2 or Q3 is active, the corresponding terminal 22 or 24 is connected to ground, activating alarm control circuit 32 in the same manner as activation of one of the existing sensors 40 in the vehicle.

Transistors Q2 and Q3 are activated by analog circuitry which processes electrical vibration signals produced by sensor 17, which may be for example a piezoelectric strip available as part number 10027941 from Amp, P.O. Box 3608, Harrisburg, Pa. 17105.

Sensor 17 is connected differentially across the input terminals of an operational amplifier 42. Amplifier 42 produces a low-pass filtered version 60 (FIG. 3) of the vibration signals from sensor 17 (low pass filtering is provided by capacitor C3 and resistor R5, the values of which, when multiplied together, produce a time constant of approximately 3 milliseconds).

The filtered output of amplifier 42 is fed to the non-inverting inputs of operational amplifiers 44 and 46, which are wired as comparators. The inverting inputs of amplifiers 44 and 46 are connected to the wipers of potentiometers RP2 and RP3. Thus, amplifiers 44 and 46 compare the voltage of the filtered analog signal from amplifier 42 to threshold voltages which are generated by adjusting potentiometers RP2 and RP3. If the filtered vibration signal from amplifier 42 exceeds a threshold, the output of the corresponding amplifier 44 or 46 saturates at the positive supply voltage. Otherwise, the output of the corresponding amplifier 44 or 46 saturates at the ground voltage.

The output of amplifier 44 is coupled, via resistor R10, to the base of transistor Q2. Thus, whenever the output of amplifier 44 is positive (indicating a filtered vibration signal in excess of the threshold set by potentiometer RP2), transistor Q2 is active, activating alarm control circuit 32 via sensor conductor 38. (Capacitor C1 interacts with resistors R10 and R11 to low-pass filter the output of amplifier 44; however, the time constant of this filter is approximately 0.2 microseconds, which is far shorter than the time constant of the low-pass filter created by amplifier 42, and thus does not result in significant additional time delay.)

The output of amplifier 46 is not directly coupled to transistor Q3; instead, the output of amplifier 46 is connected to a sample-and-hold circuit comprised of two parallel diodes D5, a capacitor C7 and a resistor R19. Operational amplifier 48, which is wired as a comparator, compares the voltage of capacitor C7 at its inverting input to a reference voltage at its non inverting input; the reference voltage is generated by resistors R17 and R18, which are wired as a voltage divider and produce a voltage of approximately one-sixth of the power supply voltage.

When the output of amplifier 46 is positive (indicating that the filtered vibration signal from amplifier 42 exceeds the threshold set by potentiometer RP3), capacitor C7 charges to a voltage near to the power supply voltage. Because this capacitor voltage exceeds one-sixth of the power supply voltage, the output of amplifier 48 saturates at the power supply voltage. Amplifier 48 is connected to transistor Q3 in a manner similar to the manner in which amplifier 44 is connected to transistor Q2; thus, when amplifier 48 saturates at the power supply voltage, transistor Q3 is activated, triggering alarm control circuit 32 via terminal 20 and sensor conductor 36.

If the filtered vibration signal from amplifier 42 falls below the threshold set by potentiometer RP3, the output of amplifier 46 saturates at the ground voltage. In this situation, diodes D5 turn off, and therefore capacitor C7 remains charged near to the positive power supply voltage. Thus, even after the filtered vibration signal falls below the threshold, amplifier 48 will remain saturated at the power supply voltage, and transistor Q3 will remain activated.

If, however, the filtered vibration signal remains below the threshold set by potentiometer RP3 for any period of time, capacitor C7 will discharge through resistor R19. The rate of discharge is determined by the product of the values of resistor R19 and capacitor C7, and has a time constant of approximately 0.5 seconds. Thus, if the filtered vibration signal remains below the threshold for longer than approximately 0.5 seconds, capacitor C7 will discharge to a voltage less than one-sixth of the power supply voltage. When this occurs, amplifier 48 will as a result saturate at the ground voltage, and transistor Q3 will deactivate.

Figure 3:
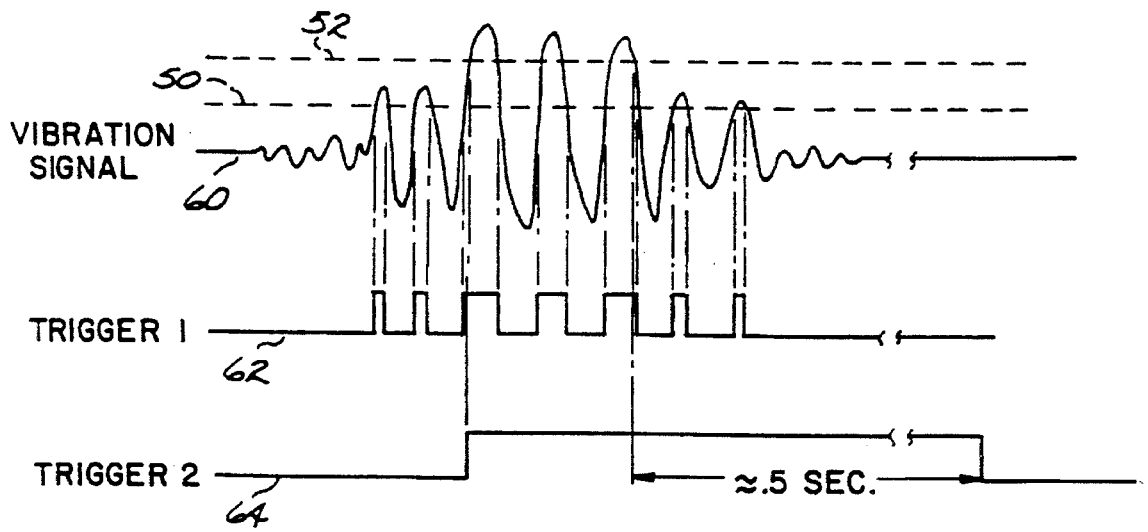
FIG. 3 is a timing diagram illustrating the electrical behavior of the circuitry of FIG. 2.

Referring to FIG. 3, in accordance with the forgoing, in response to mechanical shock producing a filtered vibration signal 60 from the piezoelectric strip 17 having a burst of large magnitude oscillation, the circuit of FIG. 2 will produce electrical ground connections on one or both of lines 20 and 22. (Traces 62 and 64 of FIG. 3 illustrate logically the state of the transistors Q2 and Q3 which connect respectively to the trigger 1 terminal 22 and the trigger 2 terminal 20. An active transistor state, during which a ground connection is being made, is indicated by a high or logic "1" value in the traces 62 and 64 of FIG. 3).

As can be seen in FIG. 3, trigger 1 terminal 22 will be connected (via transistor Q2) to ground whenever the filtered vibration signal 60 exceeds a first threshold 50. Trigger 2 terminal 20 will be connected (via transistor Q3) to ground for a period beginning whenever the filtered vibration signal 60 exceeds a second threshold 52, and continuing until the filtered vibration signal 60 has not exceeded the second threshold 52 for a period of approximately 0.5 seconds.

The foregoing circuit can be connected to an existing vehicle alarm system to provide a shock detector having dual sensitivity. For example, if the thresholds 50, 52 are set as shown in FIG. 3, trigger I terminal 22 can be attached to a sensor conductor of the alarm system to create a "minor" alarm, e.g. a brief audible signal, whenever the vehicle or other property is lightly shocked, e.g. by a pedestrian bumping the vehicle. Trigger 2 terminal 20 can be attached to a sensor conductor of the alarm system to create a "major" alarm, e.g. a continuous audible blast, whenever the vehicle or other property is severely shocked, e.g. by smashing a window. This dual level sensitivity can provide an effective deterrent to carelessness by others, without the annoyance which frequently accompanies over-sensitive shock detectors.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the shock detector described above could be used in applications other than theft prevention; for example, the shock detector described above could be mounted to a floor or wall and connected to the electric light wiring so that the detector turns on room lights when an occupant enters a room. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A mechanical shock detector for aftermarket retrofit to property having an existing alarm system, comprising:

a circuit board having a common and first and second trigger terminals for connection to said existing alarm system, a piezoelectric transducer electrically connected to said circuit board detecting mechanical vibration and producing an electrical vibration signal representative of said mechanical vibration, a housing for mechanically supporting said circuit board and said piezoelectric transducer and including mountings for mechanically coupling said housing to said property, said common and first and second trigger terminals extending outside of said housing for connection to said existing alarm system of said property, said circuit board including first and second detection circuits responsive to said vibration signal, said first and second detection circuits respectively generating first and second electrical threshold signals and comparing said vibration signal to said first and second threshold signals, said first and second detection circuits including first and second switches coupled between said common terminal and a respective one of said first and second trigger terminals and creating an electrical connection therebetween if said vibration signal respectively exceeds in magnitude a respective one of said first and second threshold signals.

2. The mechanical shock detector of claim 1 wherein said circuit board further comprises a power terminal extending outside of said housing for connection to a power source in said property to draw electrical power to operate said transducer and said first and second detector circuits.

3. The mechanical shock detector of claim 1 wherein said circuit board includes surface-mounted electronic components, thereby reducing its size.

4. An improved vehicle alarm system of the type including an alarm circuit which generates an alarm upon detection of an electrical connection between a sensor conductor and a common conductor, the improvement comprising a mechanical shock detector retrofitted to said alarm system, comprising
   a circuit board having a common and first and second trigger terminals for connection to said alarm circuit,
   a piezoelectric transducer electrically connected to said circuit board detecting mechanical vibration and producing an electrical vibration signal representative of said mechanical vibration,
   a housing for mechanically supporting said circuit board and said piezoelectric transducer and mounted to said vehicle, said common and first and second trigger terminals extending outside of said housing,
   said circuit board including first and second detection circuits responsive to said vibration signal, said first and second detection circuits respectively generating first and second electrical threshold signals and comparing said vibration signal to said first and second threshold signals, said first and second detection circuits including first and second switches coupled between said common terminal and a respective one of said first and second trigger terminals and creating an electrical connection therebetween if said vibration signal respectively exceeds in magnitude a respective one of said first and second threshold signals;

wherein said common conductor of said alarm circuit is electrically connected to said common terminal of said mechanical shock detector, and said sensor conductor of said alarm circuit is electrically connected to said first trigger terminal of said mechanical shock detector.

5. The improved vehicle alarm system of claim 4 wherein said common conductor of said alarm circuit is electrically connected to said vehicle.

6. The improved vehicle alarm system of claim 5 wherein said sensor conductor of said alarm circuit is electrically connected to a sensor switch mounted to a door of said vehicle, said sensor switch forming an electrical connection between said sensor conductor and said vehicle when said door is opened.

7. The improved vehicle alarm system of claim 4 wherein said alarm circuit includes a second sensor conductor, and said alarm circuit generates a second, different alarm upon detection of an electrical connection between said second sensor conductor and said common conductor, and said second sensor conductor of said alarm circuit is electrically connected to said second trigger terminal of said mechanical shock detector, whereby said alarm circuit generates different alarms when different amounts of mechanical vibration are imparted to said vehicle.

8. A method of retrofitting a property alarm system of the type including an alarm circuit which generates an alarm upon detection of an electrical connection between a sensor conductor and a common conductor, to include a mechanical shock detection alarm, comprising mounting a mechanical shock detector to said property, said mechanical shock detector comprising
a circuit board having a common and first and second trigger terminals for connection to said alarm circuit,
a piezoelectric transducer electrically connected to said circuit board detecting mechanical vibration and producing an electrical vibration signal representative of said mechanical vibration,
a housing for mechanically supporting said circuit board and said piezoelectric transducer and for mounting to said property, said common and first and second trigger terminals extending outside of said housing,
said circuit board including first and second detection circuits responsive to said vibration signal, said first and second detection circuits respectively generating first and second electrical threshold signals and comparing said vibration signal to said first and second threshold signals, said first and second detection circuits including first and second switches coupled between said common terminal and a respective one of said first and second trigger terminals and creating an electrical connection therebetween if said vibration signal respectively exceeds in magnitude a respective one of said first and second threshold signals;

electrically connecting said common conductor of said alarm circuit to said common terminal of said mechanical shock detector; and electrically connecting said sensor conductor of said alarm circuit to said first trigger terminal of said mechanical shock detector.

9. The method of claim 8 wherein said property is a vehicle.

10. The method of claim 9 wherein said common conductor of said alarm circuit is electrically connected to said vehicle, and said common terminal of said mechanical shock detector is electrically connected to said common conductor of said alarm circuit by electrically connecting said common terminal to said vehicle.

11. The method of claim 8 wherein said alarm circuit includes a second sensor conductor, and said alarm circuit generates a second, different alarm upon detection of an electrical connection between said second sensor conductor and said common conductor, further comprising electrically connecting said second sensor conductor of said alarm circuit to said second trigger terminal of said mechanical shock detector, whereby said alarm circuit generates different alarms when different amounts of mechanical vibration are imparted to said vehicle.

12. An improved room lighting system of the type including a switch circuit which illuminates lights in a room by forming an electrical connection between a sensor conductor and a common conductor, the improvement comprising a mechanical shock detector retrofitted to said lighting system, comprising a circuit board having a common and first and second trigger terminals for connection to said switch circuit,
a piezoelectric transducer electrically connected to said circuit board detecting mechanical vibration and producing an electrical vibration signal representative of said mechanical vibration,
a housing for mechanically supporting said circuit board and said piezoelectric transducer and mounted to said room, said common and first and second trigger terminals extending outside of said housing,
said circuit board including first and second detection circuits responsive to said vibration signal, said first and second detection circuits respectively generating first and second electrical threshold signals and comparing said vibration signal to said first and second threshold signals, said first and second detection circuits including first and second switches coupled between said common terminal and a respective one of said first and second trigger terminals and creating an electrical connection therebetween if said vibration signal respectively exceeds in magnitude a respective one of said first and second threshold signals;

wherein said common conductor of said switch circuit is electrically connected to said common terminal of said mechanical shock detector, and said sensor conductor of said switch circuit is electrically connected to said first trigger terminal of said mechanical shock detector.

* * * * *

UNITED STATES PATENTS AND TRADEMARK OFFICE
CERTIFICATE OF CORRECTION

PATENT NO. : 5,459,447
DATED : October 17, 1995
INVENTOR(S) : Snyder et al.

It is certified that error appears in the above-identified patent and that said Letters Patent is hereby corrected as shown below On title page, Section [73] Assignee: should read as:

Jon Snyder, Inc. d/b/a Bulldog Security
      Wintersville, Ohio

Signed and Sealed this

First Day of April, 1997

Attest:

BRUCE LEHMAN

Attesting Officer    Commissioner of Patents and Trademarks